United States Patent
Zipperer

(10) Patent No.: US 10,037,287 B2
(45) Date of Patent: *Jul. 31, 2018

(54) METHOD FOR PROTECTING MEMORY AGAINST UNAUTHORIZED ACCESS

(71) Applicant: TEXAS INSTRUMENTS INCORPORATED, Dallas, TX (US)

(72) Inventor: Johann Zipperer, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,815

(22) Filed: May 22, 2017

(65) Prior Publication Data

US 2017/0262384 A1    Sep. 14, 2017

Related U.S. Application Data

(62) Division of application No. 12/563,712, filed on Sep. 21, 2009, now Pat. No. 9,690,718.

(60) Provisional application No. 61/141,907, filed on Dec. 31, 2008.

(30) Foreign Application Priority Data

Sep. 19, 2008  (DE) ........................ 10 2008 048 066

(51) Int. Cl.
   *G06F 12/14*   (2006.01)
   *G06F 21/53*   (2013.01)

(52) U.S. Cl.
   CPC .......... *G06F 12/1425* (2013.01); *G06F 21/53* (2013.01)

(58) Field of Classification Search
   CPC .......... G06F 12/14; G06F 21/53; G06F 21/78; G06F 12/1425
   USPC ...... 711/163, 165; 726/26–27; 713/189, 193
   See application file for complete search history.

(56) References Cited

U.S. PATENT DOCUMENTS

| | | |
|---|---|---|
| 5,619,670 A | 4/1997 | Shindo |
| 8,156,298 B1 | 4/2012 | Stubblefield |
| 2003/0023822 A1 | 1/2003 | Scott et al. |
| 2004/0105336 A1 | 6/2004 | Choi et al. |
| 2006/0015749 A1 | 1/2006 | Mittal |
| 2007/0156987 A1 | 7/2007 | Chen et al. |
| 2008/0155188 A1 | 6/2008 | Courcambeck et al. |

(Continued)

FOREIGN PATENT DOCUMENTS

| | | |
|---|---|---|
| DE | 43 03 406 | 8/1993 |
| DE | 197 09 975 | 4/1999 |

OTHER PUBLICATIONS

Search Report for 10 2008 048 066.5 Texas Instruments Deutschland GmbH, dated Jul. 7, 2017.

*Primary Examiner* — Jasmine Song
(74) *Attorney, Agent, or Firm* — Kenneth Liu; Charles A. Brill; Frank D. Cimino

(57) ABSTRACT

A method of protecting software for embedded applications against unauthorized access. Software to be protected is loaded into a protected memory area. Access to the protected memory area is controlled by sentinel logic circuitry. The sentinel logic circuitry allows access to the protected memory area from only either within the protected memory area or from outside of the protected memory area but through a dedicated memory location within the protected memory area. The dedicated memory location then points to protected address locations within the protected memory area.

19 Claims, 2 Drawing Sheets

(56) References Cited

U.S. PATENT DOCUMENTS

2009/0210644 A1 8/2009 Batifoulier et al.

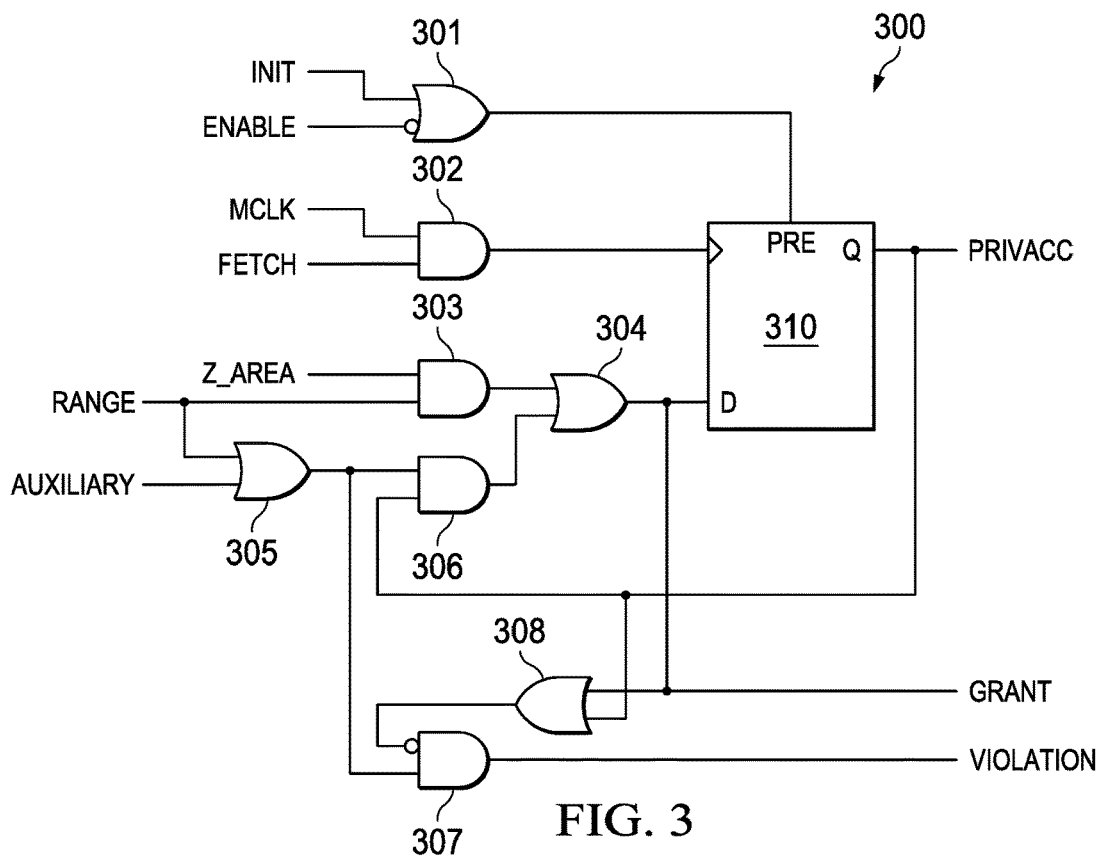
FIG. 3
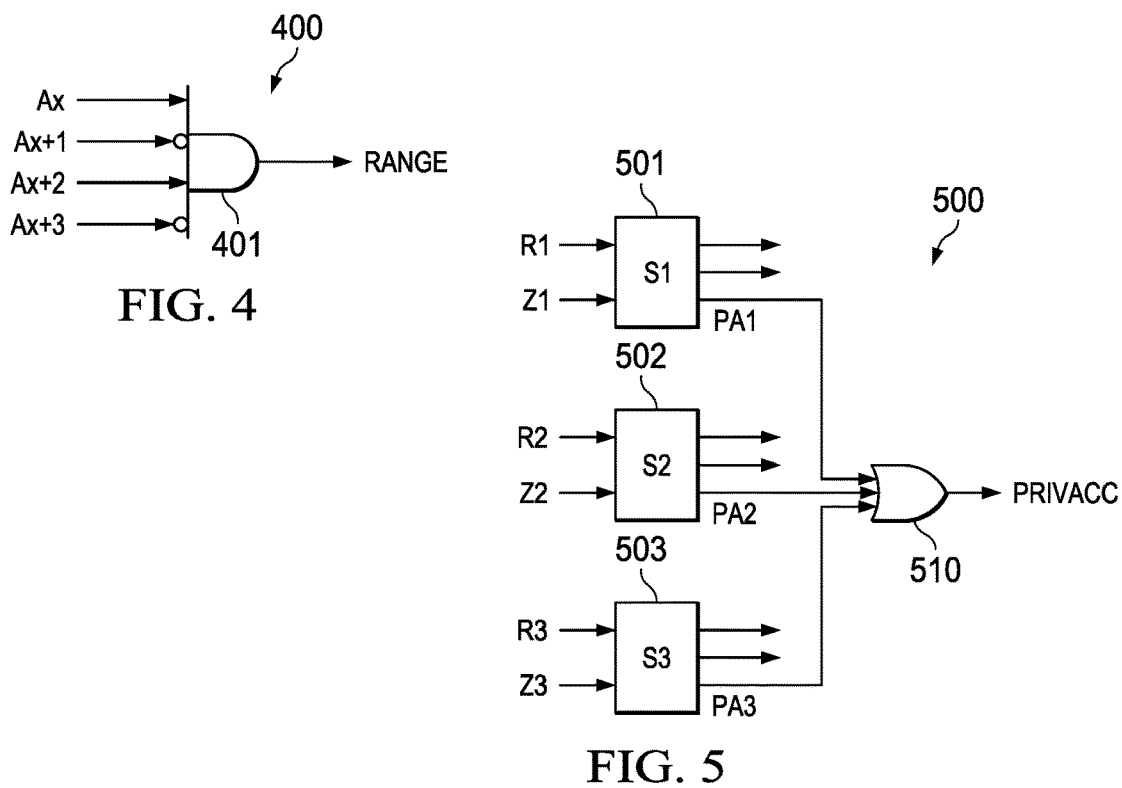
FIG. 4
FIG. 5

METHOD FOR PROTECTING MEMORY AGAINST UNAUTHORIZED ACCESS

CLAIM OF PRIORITY

This application is a divisional of U.S. patent application Ser. No. 12/563,712 filed Sep. 21, 2009, which claims priority under 35 U.S.C. 120 to German Patent Application No. 10 2008 048 066.5filed Sep. 19, 2008 and under 35 U.S.C. 119(e) (1) to U.S. Provisional Patent Application No. 61/141,907 filed Dec. 31, 2008.

TECHNICAL FIELD OF THE INVENTION

The technical field of this invention is a method for protecting software of embedded applications against unauthorized access.

BACKGROUND OF THE INVENTION

Embedded applications using programmable devices such as microcontrollers require software to operate. Software (SW) and its underlying intellectual property (IP) is part of the whole solution and represents a monetary value that may need to be protected. The interest to protect this IP may come from a device implementer or from a third party software vendor that sells the particular IP.

Conventional solutions rely on fusing or laser cutting circuit traces to protect software IP in particular memory areas from unauthorized access. Other solutions use an authentication process with simple keys or sometimes rolling keys that allows access only after a successful authentication.

SUMMARY OF THE INVENTION

This invention allows using protected software IP as a function or an abstract service while the SW itself, such as the applied methods, routines and etc., remains protected. This invention protects software for embedded applications against unauthorized access. The software to be protected is loaded into a protected memory area. Access to the protected memory area is controlled by sentinel logic circuitry. The sentinel logic circuitry allows access to the protected memory area only from within the protected memory area or from outside of the protected memory area but through a dedicated memory location within the protected memory area. The dedicated memory location then points to protected address locations within the protected memory area.

In the invention, a logic circuit that can be a state machine identifies the origin of code execution and decides if access to protected area is granted.

Several mechanisms operate independently of each other and allow independent IPs to execute in a protected environment. In advanced implementations of the invention those mechanisms may be nested and share the same memory regions. This allows higher protection levels, such as a box in a box method, or grouping of IPs in safe containers.

Still another aspect of the invention is an access control circuit used with sentinel logic circuitry. The access control circuit includes an address decoder with inputs to which higher address bits are applied and an output that issues a range signal when an address including these address bits is within a predefined address range. The address decoder may also issue a zero-area signal when an address points to a dedicated memory location within the protected memory area pointing to protected address locations within the protected memory area. In the preferred implementation the logic circuit includes sentinel logic circuitry with a flip-flop that latches this zero-area signal and logic gates that combine this latched zero-area signal with a range signal from the address decoder decoding a following address. This causes the flip-flop to issue a status signal indicative of a memory access into the protected memory area from within the protected memory area. This status signal is used to decide whether access to a protected memory area is allowed. Whenever an access to a protected memory area is made by an instruction residing outside of the protected memory area the status signal will be low and access will be denied unless the address to be accessed is a dedicated zero area within the protected memory area. When an access to a protected memory area is made by an instruction residing inside the protected memory area the status signal will be high and access will be allowed. Thus the zero area in the protected memory area is an "entry door" to the protected memory area since access to the protected memory area is only possible by first accessing the zero area. The zero area would typically be the bottom address of the protected memory area and contain pointers to functions of the protected IP. The application using the protected IP from the protected memory area would know and use the address of the zero area and would thus access that address and subsequently use protected functions without having to know their addresses in the protected memory area.

In an implementation with plural nested protected memory areas, the logic circuit includes plural sentinel logic circuits. Each sentinel logic circuit protects software stored in an associated one of a plurality of protected memory areas. Each sentinel logic circuit issues a status signal indicative of a memory access into a respective protected memory area from within the respective protected memory area. An OR gate combines the status signals issued by these sentinel logic circuits into an output signal indicating a memory access into any of the protected memory areas from within any of the protected memory areas.

BRIEF DESCRIPTION OF THE DRAWINGS

These and other aspects of this invention are illustrated in the drawings, in which:

FIG. 3 is a circuit diagram of exemplary sentinel logic circuitry;

FIG. 4 is a circuit diagram of an exemplary address decoder; and

FIG. 5 is a block diagram of a logic access control circuit with three sentinel logic circuits.

DETAILED DESCRIPTION OF PREFERRED EMBODIMENTS

Figure 1:
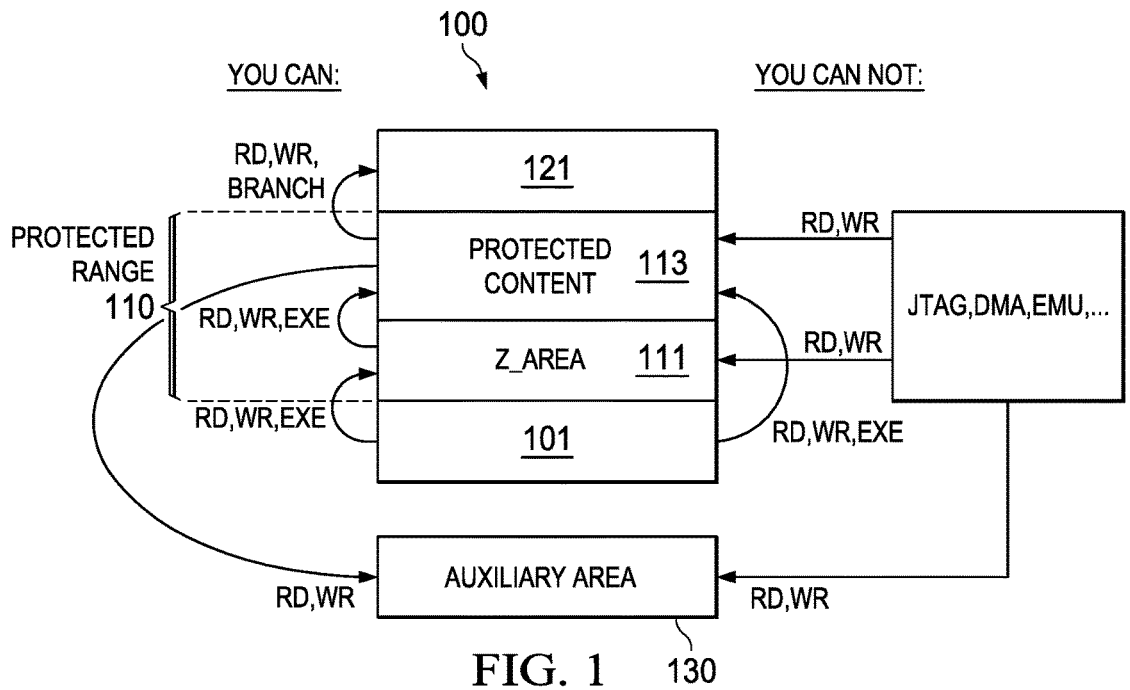
FIG. 1 is a schematic diagram of a memory including a protected area including contents to which access is restricted.

FIG. 1 illustrates a typical memory 100 of a programmed device such as a microcontroller. Memory has a non-protected bottom area 101. On top of bottom area 101, memory 100 has a protected memory area 110 which consists of a Z_area 111 and an area storing protected content 113 at higher memory addresses than Z_area 111. Z_area 111 contains pointers to address locations within protected content 113. Protected content 113 in turn contains software (SW) representing a valuable content to be protected from unauthorized access. At memory addresses above protected range 110, memory 100 typically contains a non-protected top area 121.

Optionally a separate auxiliary area 130 can be reached by read and read/write accesses from protected content 113 and is thus tied into the entire protected memory area 110.

The left-hand side of FIG. 1 ("You can:") notes permitted access routes between various memory areas indicated by arrows. Annotations on the arrows denote permitted read, write, execute and branch instructions associated with that access. Instructions within non-protected bottom area 101 may read, write or execute into Z_area 111. Instructions within Z_area 111 may read, write or execute into protected content 113. Instructions within protected content 113 may read, write or branch into non-protected top area 121. Instructions within protected content 113 may read or write into auxiliary area 130.

The right-hand side in FIG. 1 ("You can not:") notes denied access routes between various memory areas indicated by arrows. Instructions within not-protected bottom area 101 may not read, write or execution into protected content 113. Operations within a JTAG test interface, a direct memory access (DMA) or an emulation unit (EMU) may not read or write into Z_area 111, protected content 113 or auxiliary area 130.

Figure 2:
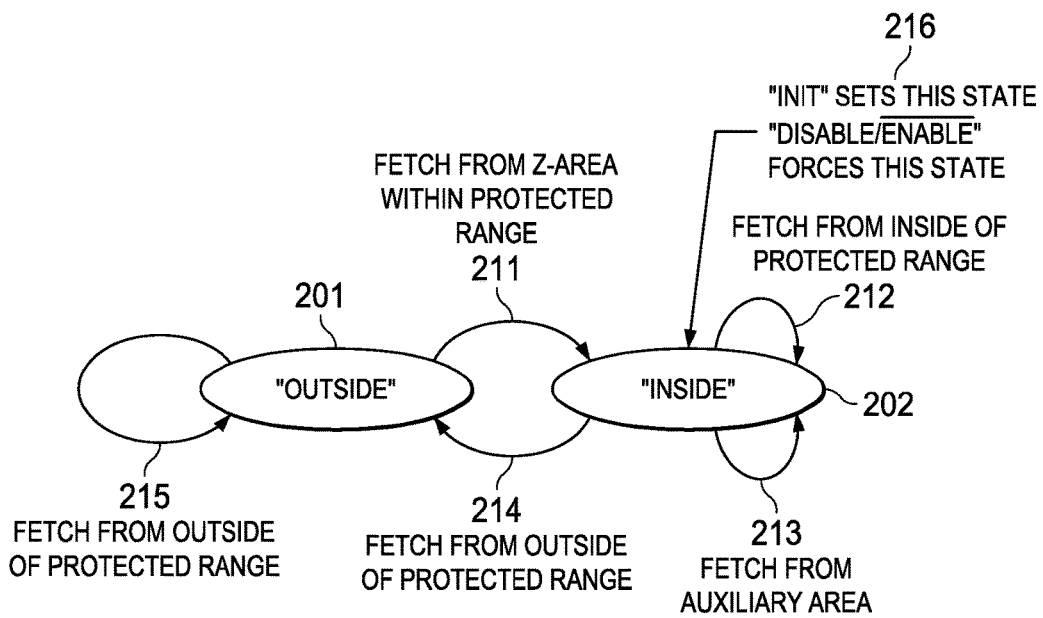
FIG. 2 is a schematic diagram of a state machine model representing operation of sentinel logic circuitry.

FIG. 2 illustrates a state diagram of the inventive method. The sentinel logic circuitry detailed below contains a flip-flop that is used to implement the two status signal states: Outside 201 and Inside 202. Outside 201 indicates that code execution is done from outside of a protected memory area. Inside 202 indicates that code execution is done from within a protected memory area.

FIG. 2 shows that when the current state is Outside 201, to get from Outside 201 to Inside 202 requires a fetch from Z_area 111 via path 211. After this, consecutive fetches from inside the whole protected range 110 (including Z_area 111) via path 212 and fetches from inside auxiliary area 130 via path 213 can be performed. When the current state is Inside 202, a first fetch from outside the protected range via path 214 causes a change to Outside 201. When the current state is Outside 201, fetches from outside the protected range 110 are permitted via path 215. In this example, the system may be initialized (e.g., on power up) Init-sets-the-stute to Inside 202 via path 216 by an initialization signal Init. This starts up the system from within a protected area. In other cases, initializing the system to Outside 201 on power up may be more beneficial.

FIG. 2 illustrates that any fetch from outside of the protected range results in a status signal Outside and any fetch from inside of the protected range, or the auxiliary area tied into the protected area, results in a status signal Inside. However, a fetch from Z_area 111 within protected range 110 changes the status signal from Outside to Inside.

FIg. 3 illustrates sentinel logic circuitry 300. Sentinel logic circuitry 300 includes flip-flop 310 and a number of logic gates including OR gate 301, AND gate 302, AND gate 303, OR gate 304, OR gate 305, AND gate 306, AND gate 307 and OR gate 308. Flip-flop 310 has an output Q that issues a signal PrivAcc which is assimilated with the status signal in FIG. 2. A low output PrivAcc signals an Outside 201 condition and a high output PrivAcc signals an Inside 202 condition.

The following signals are used or issued by the sentinel logic circuit in FIG. 3:
  Init: initializes circuit after reset;
  Enable: enables protection circuit;
  MCLK: main clock of CPU in a programmed device;
  Fetch: High on fetch access of the central processing unit (CPU) of the system;
  Range: High when protected address range is selected, usually on a module select;
  Auxiliary: High when the fetched address is within a second address range that is assigned to the Range. This signal is used for protected RAM 130 that is assigned to the code executed from Range or protected peripherals. This signal is grounded low if only a single program memory block is to be protected.
  Z_area: High when Protection is bypassed, usually on Z_area 113 (bottom address area) of protectable memory 110;
  PrivAcc: Signals that fetch was done from within protected memory 110. Usually this signal is ORed together with other PrivAcc signals to generate a final privilege signal for a peripheral/memory area.
  Grant: High when access to memory area is granted; and
  Violation: High on access violation to protected memory area.

The state of flip-flop 310 is preset via OR gate 301. A high Init signal indicating initialization of the system sets flip-flop 310 to the Inside status via OR gate 301. A low Enable signal indicating protection is enabled sets flip-flop 310 to the Inside status via an inverting input of OR gate 301.

Flip-flop 310 is clocked to enable transitions via the output of AND gate 302. AND gate 302 is high when the clock MCLK is high and FETCH is high indicating a memory fetch by the CPU.

The signals Range and Z_area are preferably provided by an address decoder described below in conjunction with FIG. 4. While it is possible to use an address comparator, an address decoder has significant advantages in terms of reduced complexity and power consumption.

FIG. 4 is an example of address decoder 400. Address decoder 400 includes a multiple input AND gate 401. In the example of FIG. 4, AND gate 401 receives inputs of most significant address bits Ax, Ax+1, Ax+3 and Ax+3 to four respective inputs. The second and fourth inputs are inverting inputs. In this example, the output Range of AND gate 401 is high for a bit pattern "1010" and low otherwise.

Returning to FIG. 3, a high Z_area value combined with a high Range value supplies a high value to the D-input of flip-flop 310 via AND gate 303 and OR gate 304. The output PrivAcc of flip-flop is fed back to the D-input via OR gate 304 and AND gate 306 when the signal Range or the signal Auxiliary is high as set by OR gate 305. Accordingly, flip-flop 310 latches an Inside condition once a fetch into Z_area 111 occurs. This remains as long as further fetches occur from inside of the protected memory area. OR gate 304 also generates a Grant signal when the address is within the protected Range and within the Z_area (as determined by AND gate 303) or the address fetch is within the Range or the Auxiliary area as determined by OR gate 305 and no grant signal is generated by OR gate 304 or flip-flop 310 is in the Inside condition as determined by the inverting input of AND gate 307. Possible responses to a Violation signal are a system reset or branching to an interrupt that calls a service routine.

In a typical application, more than one protected memory area may be used. FIG. 5 shows a combination circuit 500 including three sentinel logic circuits S1 501, S2 502 and S3 503. Each sentinel logic circuit 501, 502 and 503 is associated with one out of three different protected memory areas which can be combined or nested. Each sentinel logic circuit 501, 502 and 503 has a corresponding Range signal (R1, R2 and R3) and a corresponding Z_area signal (Z1, Z2 and Z3). Each sentinel logic circuit 501, 502 and 503 may be configured as shown in FIG. 3 to issue a corresponding Grant signal, a Violation signal not labelled in FIG. 5. Each sentinel logic circuit 501, 502 and 503 may be configured as shown in FIG. 3 to issue a corresponding status signal PA1, PA2 and PA3. The status signals PA1, PA2 and PA3 (each signaling an Inside or Outside condition) are input to OR gate 510. The output of OR gate 510 is a signal PrivAcc that signals an Inside condition when high and an Outside condition when low. This is similar to the case of a single protected memory area.

Although the invention has been described hereinabove with reference to a specific embodiment, it is not limited to this embodiment and no doubt further alternatives will occur to the skilled person that lie within the scope of the invention as claimed.

What is claimed is:

1. A method of protecting memory having a protected memory area against unauthorized access, comprising the steps of:
    allowing access to the protected memory area for read, write or execution from instructions stored inside the protected memory area;
    allowing access to a dedicated memory location of the protected memory area for read, write or execution from instructions stored outside of the protected memory area, wherein the dedicated memory location includes instructions pointing to protected address locations within the protected memory area; and
    prohibiting access to any memory location of the protected memory area other than the dedicated memory location for read, write or execution from the instructions stored outside of the protected memory area.

2. The method of claim 1, further comprising using sentinel logic circuitry to monitor accesses to the memory.

3. The method of claim 2, wherein monitoring the accesses to the memory includes:
    receiving monitored addresses of a monitored memory at the sentinel logic circuitry;
    decoding the monitored addresses by the sentinel logic circuitry; and
    issuing a range signal when a decoded monitored address falls within an address range corresponding to the protected memory area.

4. The method of claim 3, wherein decoding the monitored addresses includes receiving a selected number of most significant address bits at respective inputs of an AND logic gate, and producing a range signal based on an output of the AND logic gate.

5. The method of claim 4, wherein the inputs of the AND logic gate comprise at least one non-inverting input and at least one inverting input.

6. The method of claim 5, wherein the number of most significant address bits is greater than two.

7. The method of claim 6, wherein the number of most significant address bits is at least four.

8. The method of claim 1, wherein the instructions stored inside the protected memory area that are allowed access to the protected memory area for read, write or execution are stored inside the dedicated memory location.

9. The method of claim 1, wherein the protected address locations correspond address locations inside the protected memory area but not inside the dedicated memory location.

10. A method of protecting memory against unauthorized access, comprising the steps of:
    allowing access to the protected memory area for read, write or execution from first instructions stored inside the protected memory area;
    allowing access to a dedicated memory location of the protected memory area for read, write or execution from instructions stored outside of the protected memory area;
    prohibiting access to any memory location of the protected memory area other than the dedicated memory location for read, write or execution from the instructions stored outside of the protected memory area;
    defining at least one auxiliary memory area outside the protected memory area; and
    allowing access to the at least one auxiliary memory area only from second instructions stored inside the protected memory area.

11. The method of claim 1, further comprising generating a zero-area signal when an address points to the dedicated memory location.

12. The method of claim 10, wherein the dedicated memory location includes instructions pointing to protected address locations within the protected memory area.

13. The method of claim 12, wherein the protected address locations correspond address locations inside the protected memory area but not inside the dedicated memory location.

14. The method of claim 10, wherein the first instructions stored inside the protected memory area are stored inside the dedicated memory location.

15. The method of claim 10, wherein the second instructions are stored in a memory location inside the protected memory area that is not part of the dedicated memory location.

16. An electronic device comprising:
    a memory having a protected memory area and an unprotected area;
    access control circuitry controlling access to the protected memory area by:
        permitting access to the protected memory area for read, write or execution from instructions stored inside the protected memory area;
        permitting access to a dedicated memory location of the protected memory area for read, write or execution from instructions stored inside the unprotected memory area, wherein the dedicated memory location stores instructions pointing to protected address locations within the protected memory area; and
        denying access to any memory location of the protected memory area other than the dedicated memory location for read, write or execution from the instructions stored inside the unprotected memory area.

17. The electronic device of claim 16, wherein the instructions stored inside the protected memory area and permitted access to the protected memory area for read, write or execution are stored inside the dedicated memory location.

18. The electronic device of claim 16, wherein the protected address locations correspond address locations inside the protected memory area but outside of the dedicated memory location.

19. The electronic device of claim 16, wherein the electronic device is a microcontroller.

* * * * *